US009824836B1

(12) United States Patent
Robinson et al.

(10) Patent No.: US 9,824,836 B1
(45) Date of Patent: Nov. 21, 2017

(54) INPUT DEVICE FOR ELECTRONIC DEVICE

(71) Applicant: ACCO Brands Corporation, Lake Zurich, IL (US)

(72) Inventors: Todd Robinson, San Mateo, CA (US); Alex Klinkman, Hayward, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 0 days.

(21) Appl. No.: 15/155,927

(22) Filed: May 16, 2016

(51) Int. Cl.
*H01H 9/26* (2006.01)
*H01H 13/72* (2006.01)
(Continued)

(52) U.S. Cl.
CPC ............ *H01H 13/83* (2013.01); *H01H 13/84* (2013.01); *H01H 13/86* (2013.01); *H01H 2215/05* (2013.01); *H01H 2219/039* (2013.01)

(58) Field of Classification Search
CPC ........ H01H 13/83; H01H 13/84; H01H 13/86; H01H 2215/05; H01H 2219/039; H01H 3/00; H01H 3/02; H01H 3/12; H01H 9/00; H01H 9/02; H01H 9/04; H01H 9/16; H01H 9/161; H01H 9/167; H01H 9/181; H01H 9/182; H01H 9/18; H01H 13/00; H01H 13/02; H01H 13/14; H01H 13/04; H01H 13/50; H01H 13/70; H01H 13/68; H01H 13/7006; H01H 2003/00; H01H 2003/008; H01H 2003/12; H01H 2009/02; H01H 2009/0285; H01H 2009/16; H01H 2219/00; H01H 2219/036; H01H 2219/038;
(Continued)

(56) References Cited

U.S. PATENT DOCUMENTS 5,790,948 A   8/1998 Eisfeld et al.
5,879,088 A * 3/1999 English ................. G06F 3/0202
                                              200/306
(Continued)

FOREIGN PATENT DOCUMENTS

TW          201033856 A      9/2010

OTHER PUBLICATIONS

Alam M. B., "RPEN a New 3D Pointing Device", thesis, Oct. 2009, 182 pages, McMaster University, Hamilton, Ontario.
(Continued)

*Primary Examiner* — Anthony R. Jimenez
(74) *Attorney, Agent, or Firm* — Michael Best & Friedrich LLP

(57) ABSTRACT

An input device for use with a first electronic device and a second electronic device includes a frame, a plurality of manually depressible input members supported by the frame, a communication module supported by the frame and operable to selectively communicate with the first electronic device and the second electronic device, and a switch supported by the frame and coupled to the communication module. The switch is operable to change whether the communication module communicates with the first electronic device or the second electronic device. The input device also includes a light source coupled to the switch and positioned at least partially within the frame. The light source is operable to provide a backlight for the plurality of input members. The backlight is modified in response to actuation of the switch.

21 Claims, 15 Drawing Sheets

(51) Int. Cl.
*H01H 13/76* (2006.01)
*H01H 13/83* (2006.01)
*H01H 13/86* (2006.01)
*H01H 13/84* (2006.01)

(58) Field of Classification Search
CPC ......... H01H 2223/00; H01H 2223/002; H01H 2223/003; H01H 2223/042
USPC ....................................................... 200/5 A
See application file for complete search history.

(56) References Cited

U.S. PATENT DOCUMENTS

| | | | |
|---|---|---|---|
| 6,163,538 | A | 12/2000 | Brown et al. |
| 6,398,171 | B1* | 6/2002 | Cheng .................. G06F 1/1616 248/118 |
| 6,622,018 | B1 | 9/2003 | Erekson |
| 6,664,949 | B1 | 12/2003 | Amro et al. |
| 6,937,468 | B2 | 8/2005 | Lin et al. |
| 6,999,008 | B2 | 2/2006 | Wang et al. |
| 7,162,232 | B2 | 1/2007 | Ramakesavan et al. |
| 7,479,902 | B2 | 1/2009 | Wang et al. |
| 7,554,044 | B2* | 6/2009 | Gordon ................ H05K 5/0017 200/296 |
| 8,009,143 | B2 | 8/2011 | Huang |
| 8,363,014 | B2 | 1/2013 | Leung et al. |
| 8,369,074 | B2 | 2/2013 | Chou et al. |
| 8,441,446 | B2 | 5/2013 | Sheu et al. |
| 8,467,186 | B2 | 6/2013 | Zeliff et al. |
| 8,560,740 | B2 | 10/2013 | Hsieh |
| 8,706,031 | B2 | 4/2014 | Nowlin et al. |
| 8,717,319 | B2 | 5/2014 | Wu |
| 8,904,056 | B2 | 12/2014 | Robert et al. |
| 9,094,949 | B2 | 7/2015 | Robert et al. |
| 2003/0006966 | A1 | 1/2003 | Lin et al. |
| 2005/0073446 | A1* | 4/2005 | Lazaridis ............. G06F 3/0202 341/22 |
| 2006/0018089 | A1 | 1/2006 | Chou |
| 2006/0022948 | A1 | 2/2006 | Mori et al. |
| 2008/0042884 | A1 | 2/2008 | Hsu et al. |
| 2010/0225589 | A1 | 9/2010 | Hsieh |
| 2011/0143671 | A1 | 6/2011 | Hsieh |
| 2011/0217932 | A1 | 9/2011 | Hsieh |
| 2011/0223865 | A1 | 9/2011 | Liu |
| 2012/0200475 | A1* | 8/2012 | Baker .................... G09F 13/04 345/4 |
| 2012/0293939 | A1 | 11/2012 | Wu et al. |
| 2013/0087517 | A1 | 4/2013 | Zhong |
| 2013/0183899 | A1 | 7/2013 | Gorsev |
| 2013/0217338 | A1 | 8/2013 | Chou |
| 2013/0299326 | A1 | 11/2013 | Hsu |
| 2013/0326104 | A1 | 12/2013 | Strommen |
| 2014/0104761 | A1 | 4/2014 | Hsu |
| 2014/0139991 | A1 | 5/2014 | Gengler |
| 2014/0218303 | A1* | 8/2014 | Kao ........................ G06F 3/016 345/168 |
| 2014/0347279 | A1 | 11/2014 | Chiang |
| 2015/0111499 | A1 | 4/2015 | Robert et al. |

OTHER PUBLICATIONS

"Bluetooth Multi-Device Keyboard K480", website, Feb. 19, 2015, 4 pages, Logitech, http://www.logitech.com/en-us/product/multi-device-keyboard-k480?crid=26.

"Universal Mobile Keyboard", website, Feb. 19, 2015, 2 pages, Microsoft, http://www.microsoft.com/hardware/en-us/p/universal-mobile-keyboard.

"Wedge Mobile Keyboard", website, Feb. 19, 2015, 2 pages, Microsoft, http://www.microsoft.com/hardware/en-us/o/wedge-mobile-keyboard.

* cited by examiner

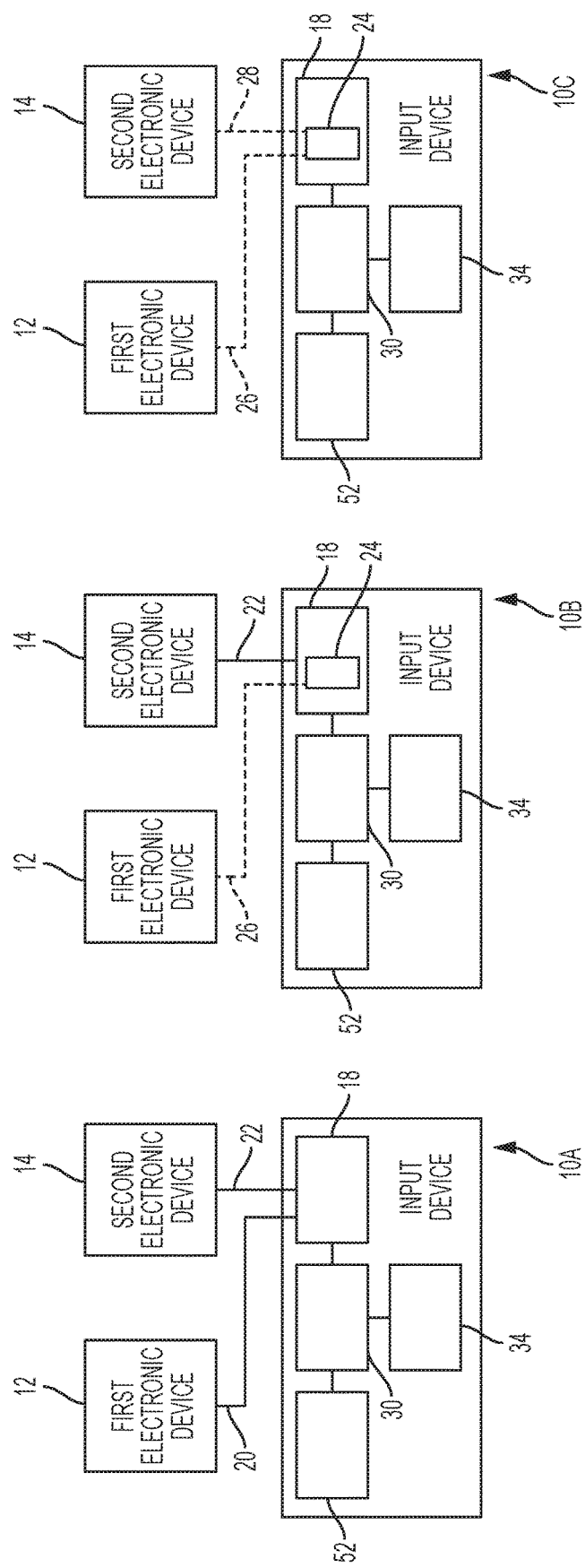

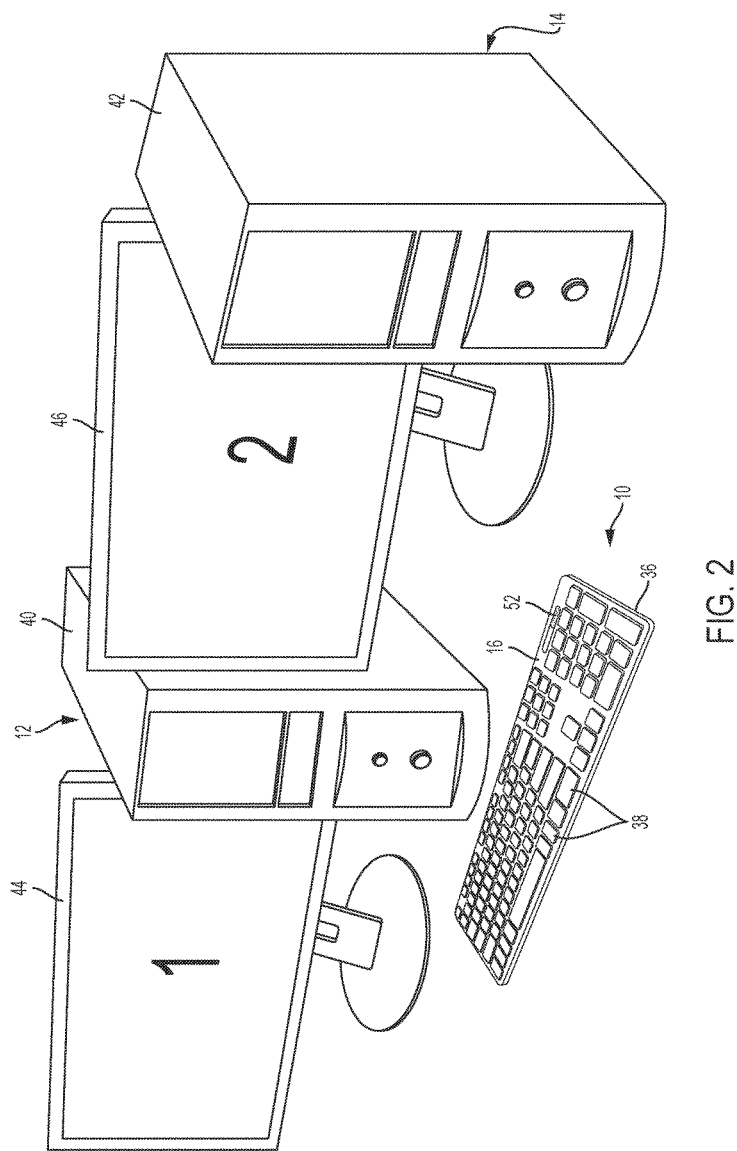

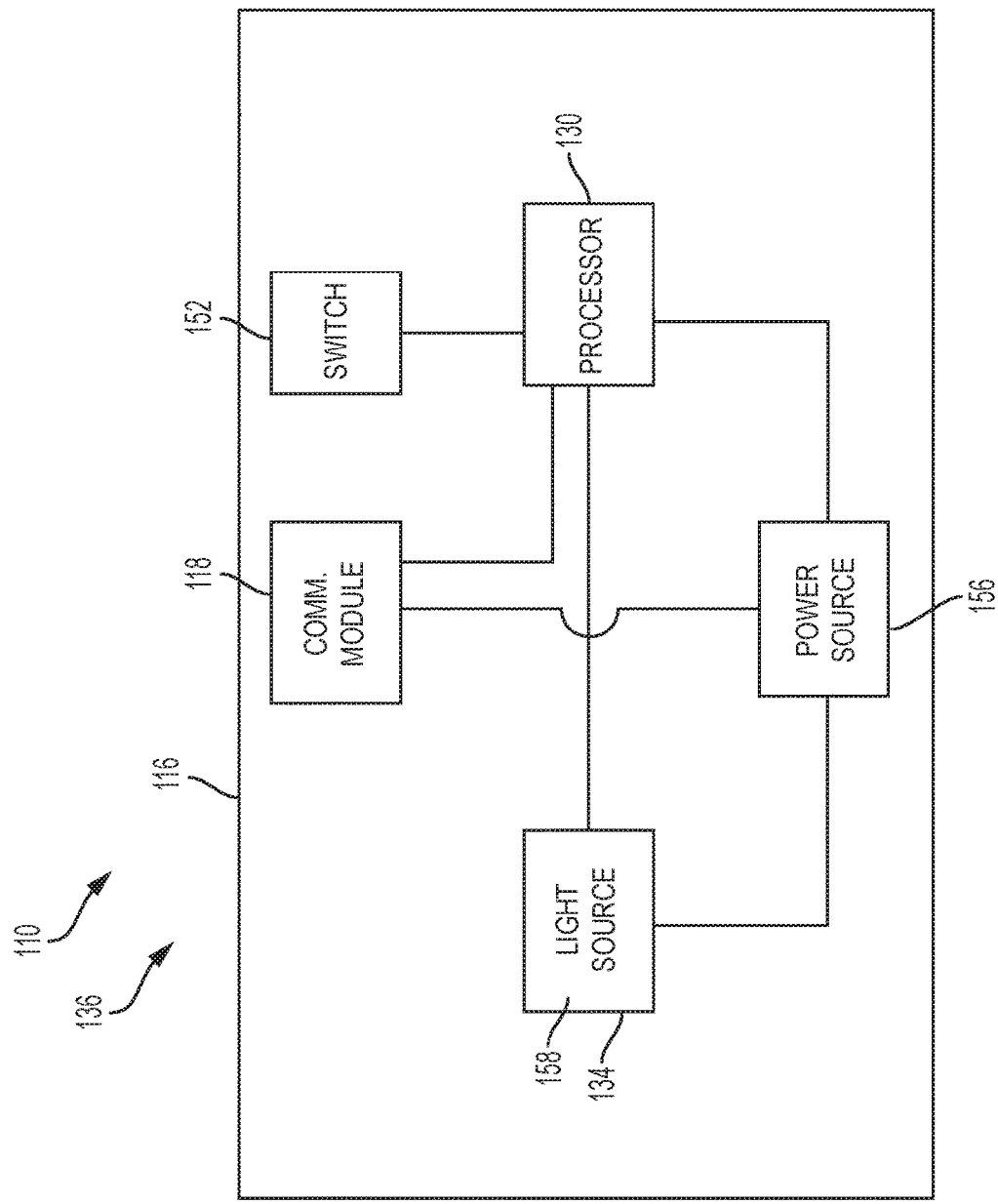

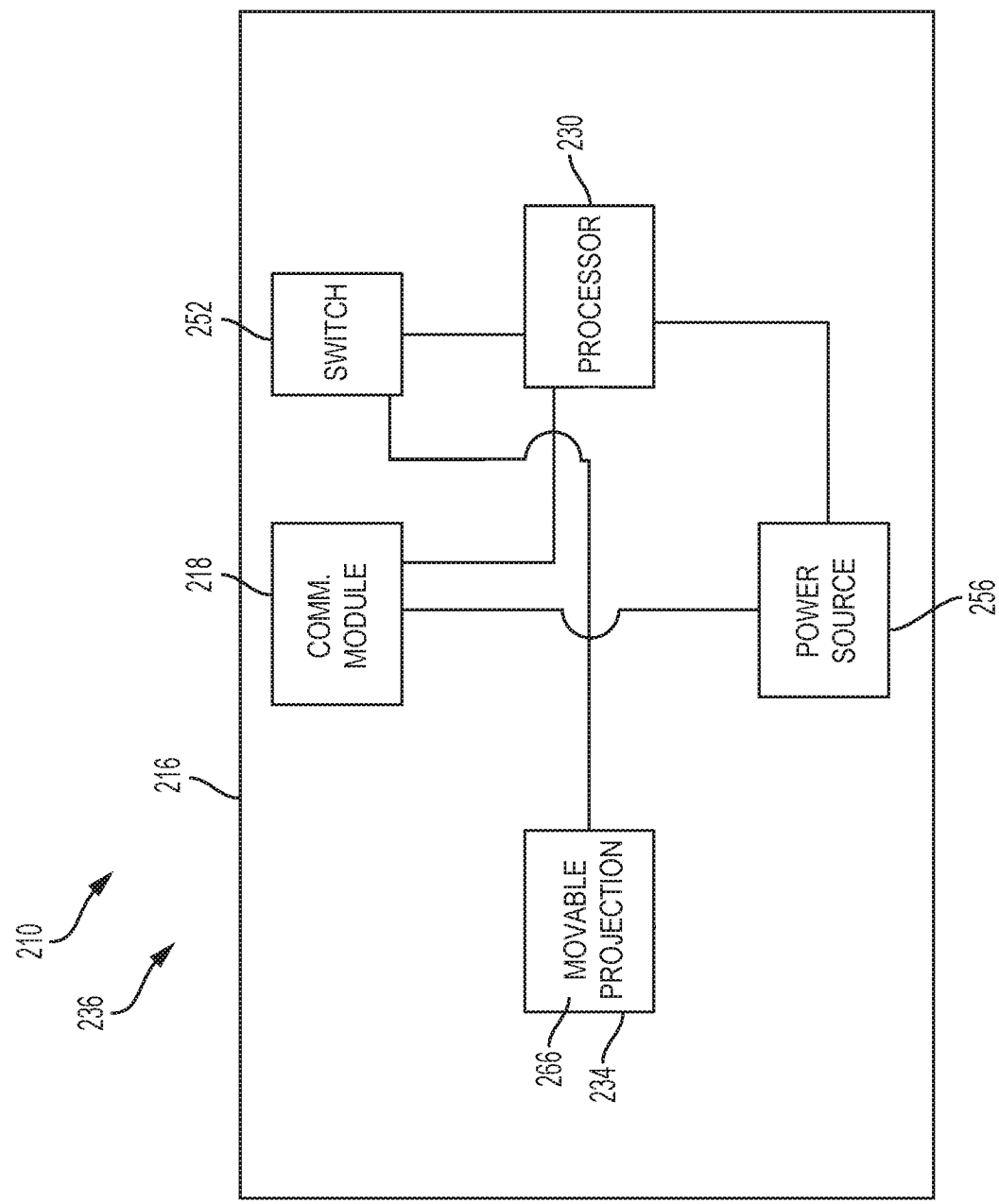

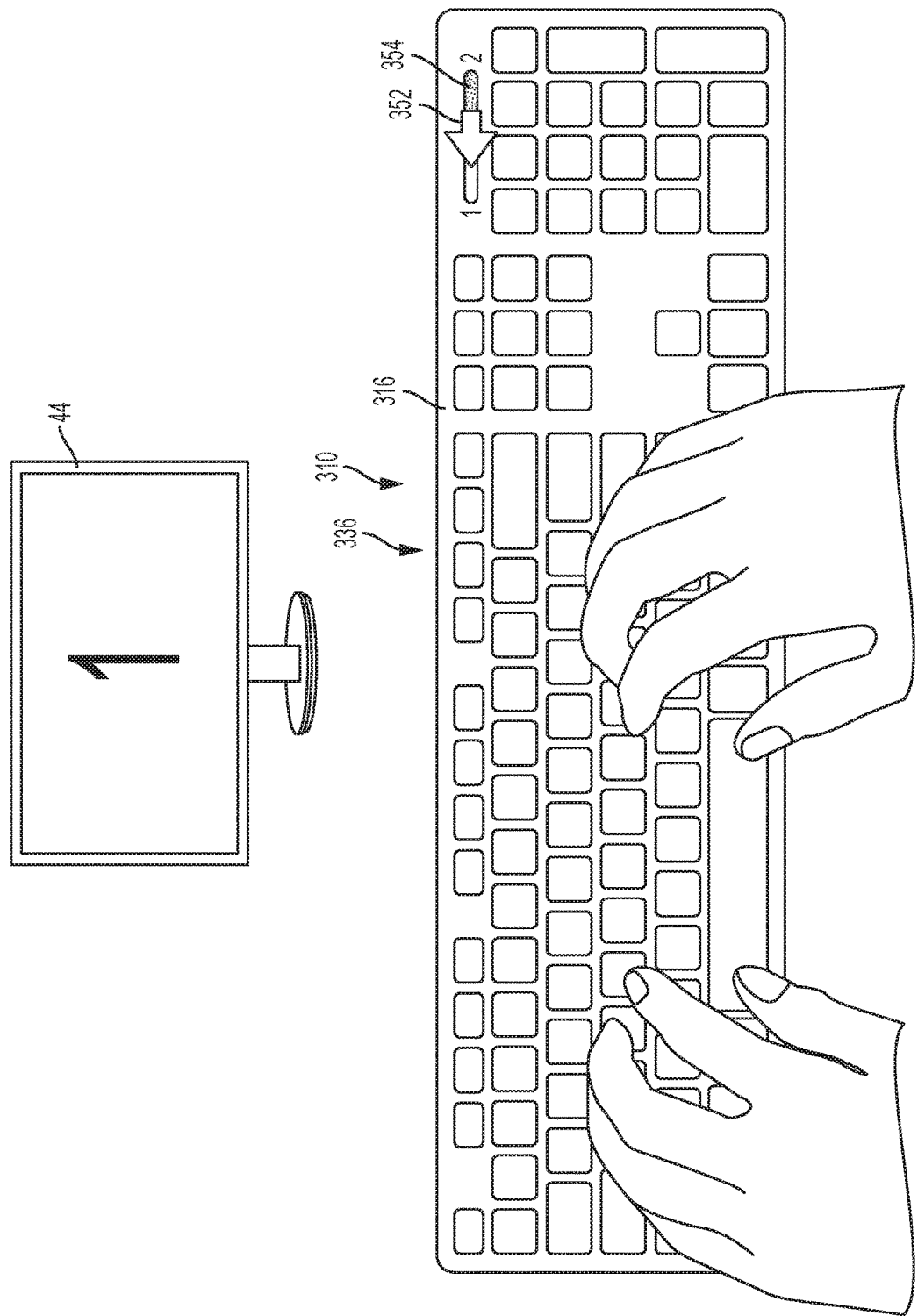

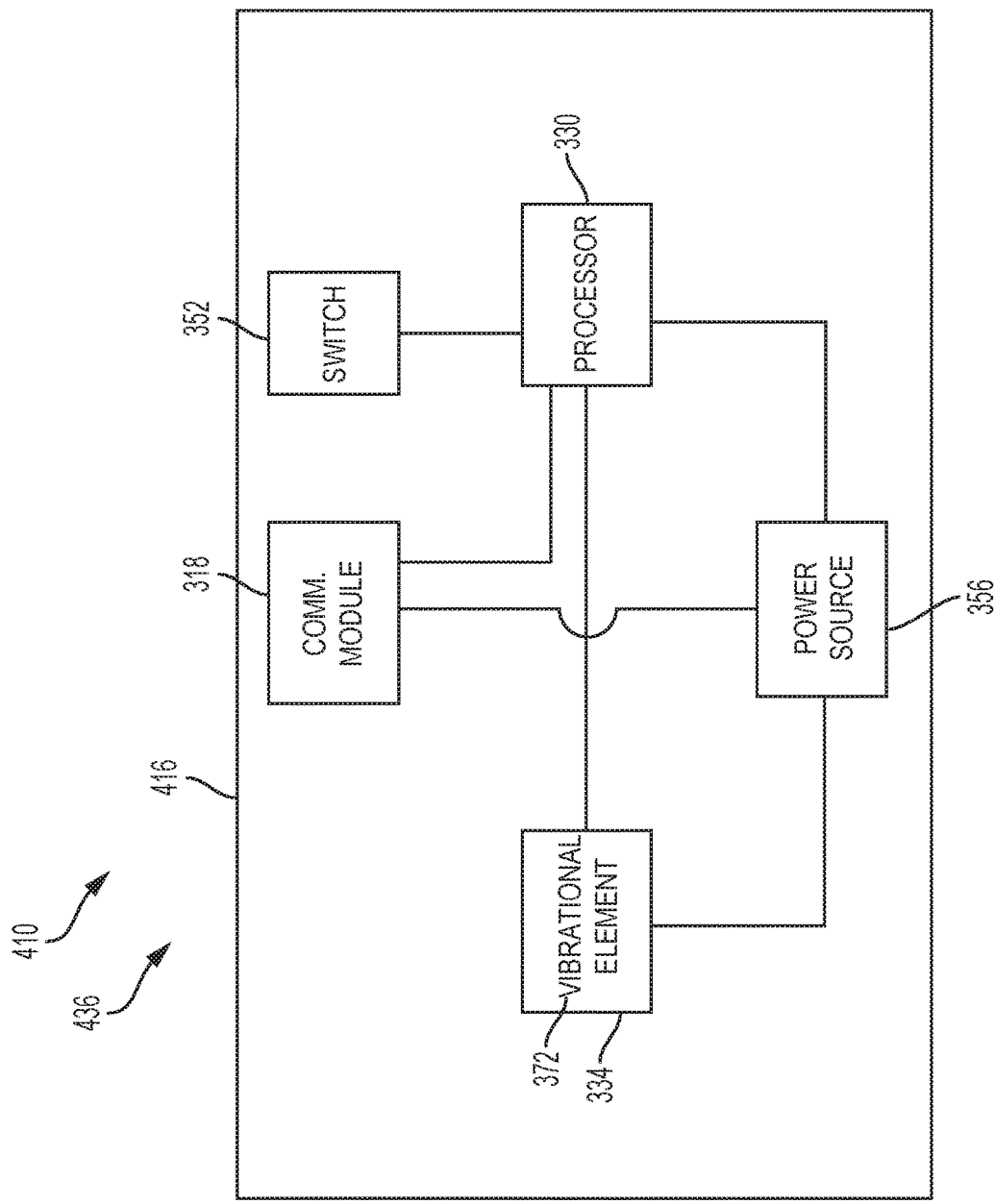

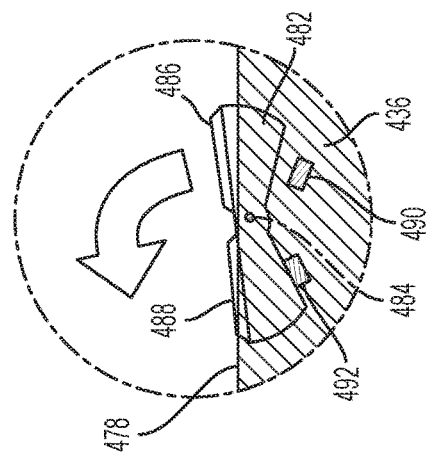
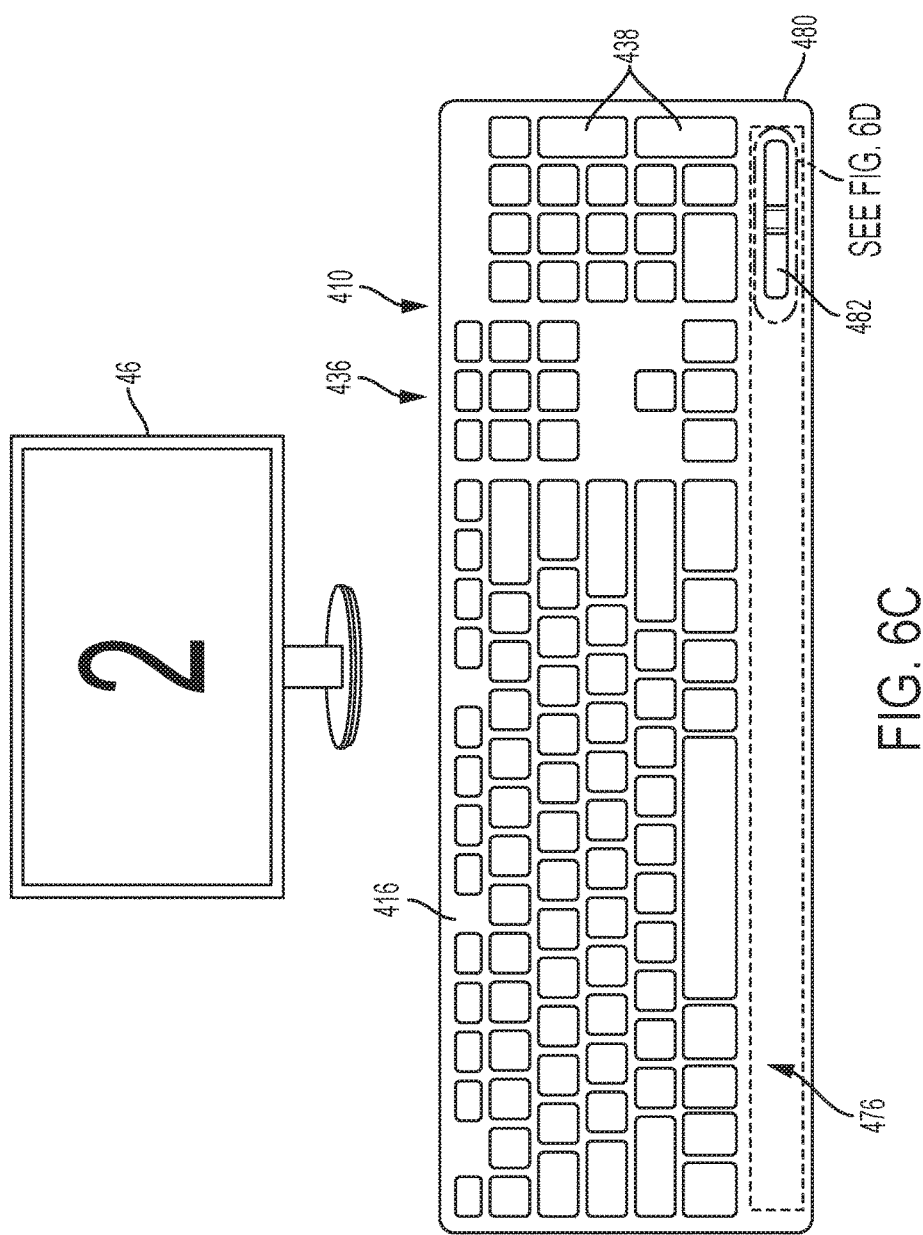
FIG. 6D
FIG. 6C

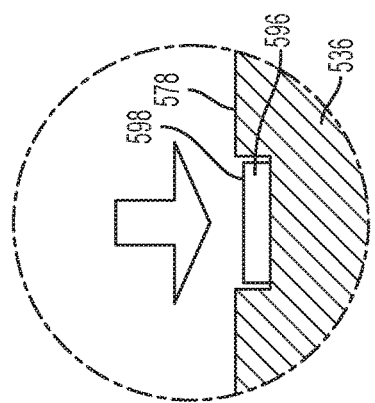
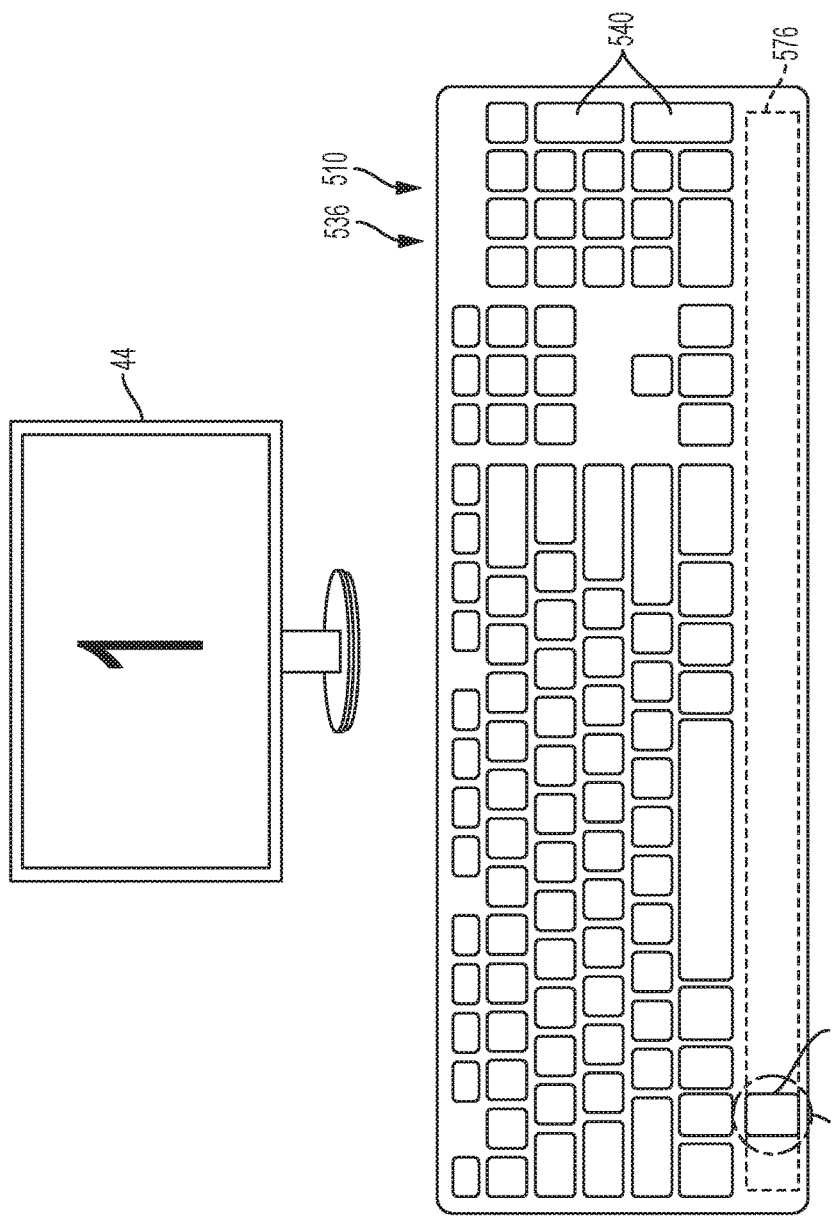
FIG. 7B
FIG. 7A

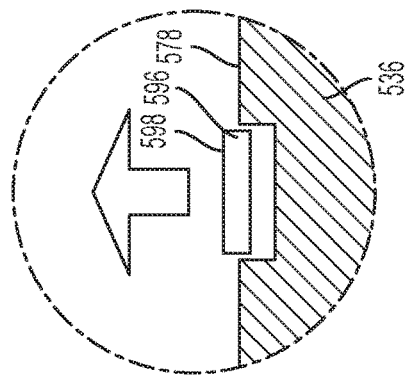
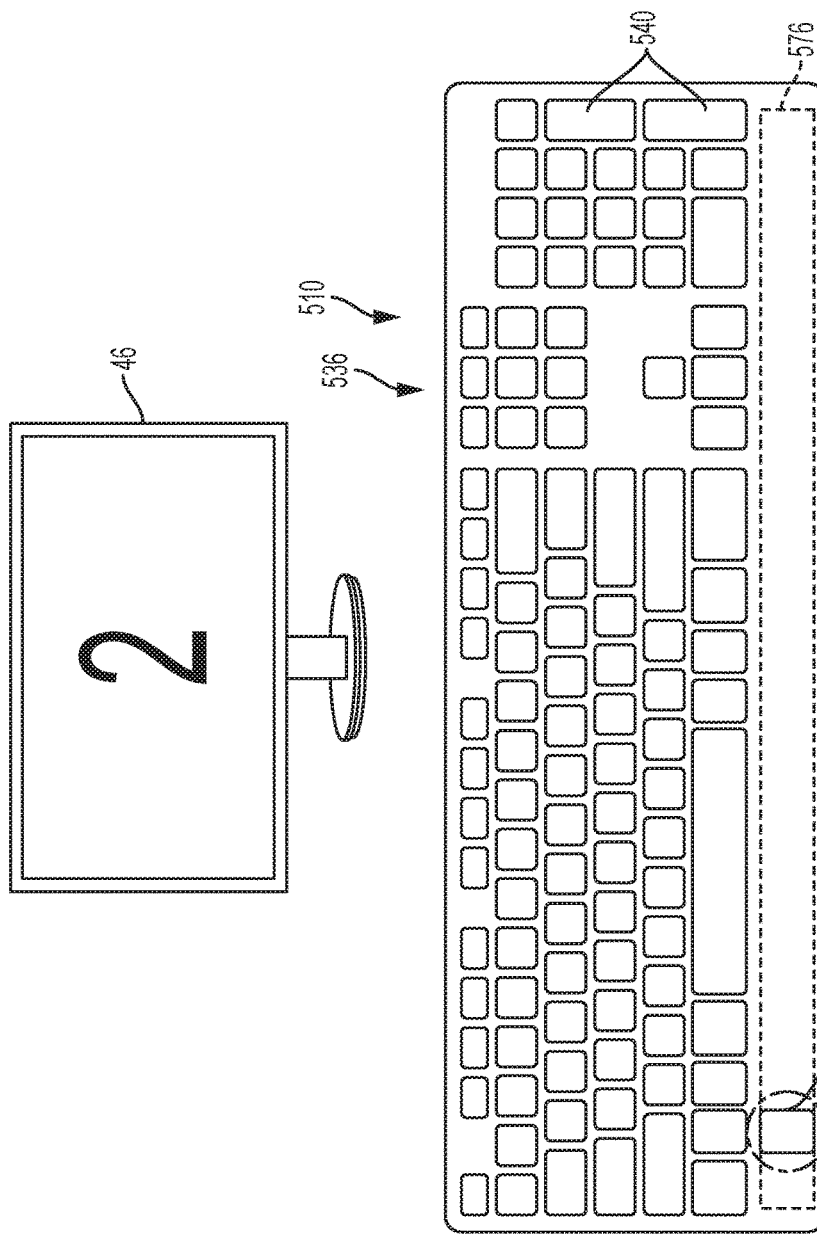
FIG. 7D
FIG. 7C

INPUT DEVICE FOR ELECTRONIC DEVICE

FIELD OF THE INVENTION

The present invention relates to electronic input devices. More particularly, the invention relates to indicators for electronic input devices such as keyboards.

SUMMARY OF THE INVENTION

The invention provides, in one aspect, an input device for use with a first electronic device and a second electronic device. The input device includes a frame, a plurality of manually depressible input members supported by the frame, a communication module supported by the frame and operable to selectively communicate with the first electronic device and the second electronic device, and a switch supported by the frame and coupled to the communication module. The switch is operable to change whether the communication module communicates with the first electronic device or the second electronic device. The input device also includes a light source coupled to the switch and positioned at least partially within the frame. The light source is operable to provide a backlight for the plurality of input members. The backlight is modified in response to actuation of the switch.

The invention provides, in another aspect, an input device for use with a first electronic device and a second electronic device. The input device includes a frame, a plurality of manually depressible input members supported by the frame, a communication module supported by the frame and operable to selectively communicate with the first electronic device and the second electronic device, and a switch supported by the frame and coupled to the communication module. The switch is operable to change whether the communication module communicates with the first electronic device or the second electronic device. The input device also includes a haptic feedback device coupled to the switch and supported by the frame. The haptic feedback device provides tactile feedback in response to actuation of the switch.

Other aspects of the invention will become apparent by consideration of the detailed description and accompanying drawings.

BRIEF DESCRIPTION OF THE DRAWINGS

FIG. 1A is a schematic representation of one embodiment of an input device in communication with first and second electronic devices.

FIG. 1B is a schematic representation of another embodiment of an input device in communication with first and second electronic devices.

FIG. 1C is a schematic representation of yet another embodiment of an input device in communication with first and second electronic devices.

FIG. 2 is a perspective view of a system including an input device embodied as a keyboard and two electronic devices embodied as desktop computers.

FIG. 3D is a schematic representation of the keyboard of FIGS. 3A-3C.

FIG. 4C is a schematic representation of the keyboard of FIGS. 4A-4B.

FIG. 5A is a top view of another keyboard in communication with the first desktop computer, the keyboard including a vibrational element.

FIG. 5C is a schematic representation of the keyboard of FIGS. 5A-5B.

FIG. 6C is a top view of the keyboard of FIG. 6A in communication with the second desktop computer.

FIG. 6D is an enlarged cross-sectional view of a portion of the keyboard of FIG. 6C with the rocker in a second position.

FIG. 7A is a top view of another keyboard in communication with the first desktop computer, the keyboard including a button.

FIG. 7B is an enlarged cross-sectional view of a portion of the keyboard of FIG. 7A with the button in a first position.

FIG. 7C is a top view of the keyboard of FIG. 7A in communication with the second desktop computer.

FIG. 7D is an enlarged cross-sectional view of a portion of the keyboard of FIG. 7C with the button in a second position.

Figure 3A:
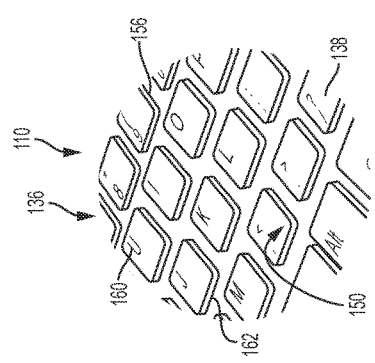
FIG. 3A is an enlarged perspective view of a portion of the keyboard of FIG. 2, the keyboard including a plurality of keys.
Figure 3B:
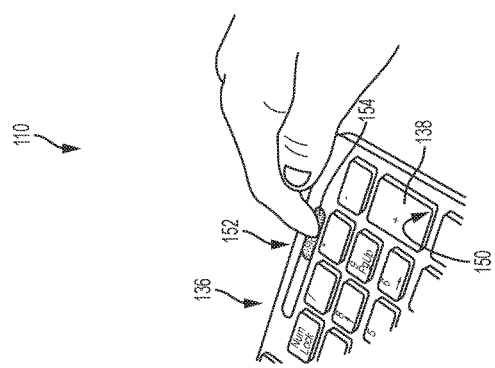
FIG. 3B is an enlarged perspective view of another portion of the keyboard of FIG. 2, the keyboard including a slider in a first position.
Figure 3C:
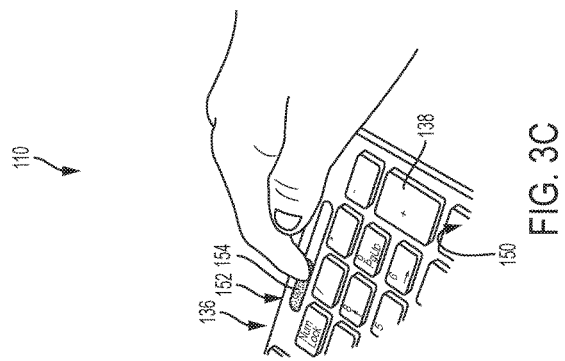
FIG. 3C is an enlarged perspective view of the portion of the keyboard shown in FIG. 3B, with the slider in a second position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1A-1C schematically illustrate input devices 10A-10C in communication with electronic devices shown as a first electronic device 12 and a second electronic device 14. Each input device 10 includes a frame 16 that supports, among other things, a communication module 18. The communication modules 18 allow the input devices 10A-C to selectively communicate with the first and second electronic devices 12, 14. As shown in FIG. 1A, the communication module 18 communicates with the electronic devices 12, 14 via wired connections, with each electronic device 12, 14 being connected to the input device 10A via a separate wire 20, 22. Alternatively, the communication modules 18 of the input devices 10A-C may be provided with a wireless transceiver 24, as shown in FIGS. 1B and 1C. In FIG. 1B, a wire 22 connects the communication module 18 of the input device 10B to the second electronic device 14, and the input device 10B wirelessly communicates with the first electronic device 12 via the wireless transceiver 24 (designated by dashed line 26). As shown in FIG. 1C, the input device 10C wirelessly communicates with both the first and second electronic devices 12, 14 (designated by dashed lines 26, 28).

With continued reference to FIGS. 1A-1C, each input device 10A-C includes a processor 30, feedback devices 34, and input members 52. The processor 30 receives an input from the switchable input member 52 in response to user input to the input member 52. The processor 30 further provides a visual or haptic output (i.e., via the feedback devices 34) to the user and additionally provides instruction to the communication module 18. As used herein, a haptic output is an output that interfaces with a user via the sense of touch. The input and visual or haptic feedback devices 34 (herein incremented by one-hundred; e.g., 134, 234, etc.) are described in greater detail with respect to FIGS. 2-7D.

The input devices 10A-C may be computer keyboards, computer mouse devices, game controllers, remote controls (e.g., a presentation remote or a remote for a home entertainment system), or the like. Likewise, the first and second electronic devices may be desktop computers, laptop computers, tablet computers, smart phones, televisions, video game systems, or other media players or presenters. Further, though the input devices 10A-C communicate with two electronic devices 12, 14, the input devices 10A-C may be further capable of communicating with and switching between more than two electronic devices (e.g., three or more electronic devices).

FIG. 2 illustrates the input device 10 embodied as a computer keyboard 36, and the first and second electronic devices 12, 14 embodied as first and second desktop computers. The keyboard 36 includes a plurality of manually depressible input members or keys 38. Each desktop computer includes a computer 40, 42 (as shown, embodied as a tower) and a monitor 44, 46. Among other things, the computers 40, 42 communicate with the communication module 18 of the keyboard 36 (as described with respect to FIGS. 1A-1C) and communicate with the respective monitor 44, 46 (e.g., via a HDMI cable, VGA cable, DVI cable, etc.) to provide visual representation of the user input to the plurality of keys 38.

FIG. 3D illustrates a keyboard 136 including a frame 116, a power source 156, a processor 130, a communication module 118, a switch 152, and a light source 158. The keyboard 136 further includes a plurality of keys 138 (FIGS. 3A-3C) operable to provide input signals to the electronic devices 12, 14. Similar to the input devices 10A-C, the keyboard 136 is operable to selectively communicate with multiple electronic devices 12, 14.

As shown in FIG. 3A, each of the plurality of keys 138 includes a top surface 150 for user contact. Each key 138 represents a character (e.g., letter, number, symbol, etc.) or command (e.g., tab, page down, caps lock, etc.) for providing an input to the computer 40, 42. The keyboard 136 further comprises the switch 152, which serves as an additional input of the keyboard 136. As shown, the switch 152 is distinct from the plurality of keys 138. The keyboard 136 communicates with the computers 40, 42 via the communication module 118, and the switch 152 provides an interface or contact member 154 allowing the user to select which computer 40, 42 is in communication with the keyboard 136 to receive the user inputs. The switch 152 transitions between a first position associated with the first electronic device 12 (i.e., the first computer 40) and a second position associated with the second electronic device 14 (i.e., the second computer 42). When the switch 152 is in the first position (FIG. 3B), the keyboard 136 communicates with the first electronic device 12 such that user input to the plurality of keys 138 is registered by the first computer 40. When a user transitions the switch 152 from the first position to the second position (FIG. 3C), the keyboard 136 communicates with the second electronic device 14 such that user input to the plurality of keys 138 is registered by the second computer 42.

With reference to FIG. 3A, the input device 110 (e.g., keyboard 136) further includes the light source 158 located under the plurality of keys 138 (i.e., away from user contact) to provide a backlight. The light source 158 may include a plurality of light emitting diodes (LEDs) or alternative light sources. Further, the light source 158 may be in an ON-state at all times (e.g., when the keyboard 136 or respective computer 40, 42 is in an ON-state) or may be utilized only when the keyboard 136 receives an input (e.g., depressing any of the plurality of keys 138, moving the switch 152, etc.). The light source 158 provides illumination through and/or around the plurality of keys 138. If the light source 158 provides illumination through the plurality of keys 138, the keys 138 may be transparent or translucent. Alternatively, a portion of the keys 160 (e.g., the character or command shown on the keys) may be transparent or translucent to permit light to pass therethrough. If the light source 158 provides illumination around the plurality of keys 138, spaces 162 between adjacent keys are illuminated. The illumination provided by the light source 158 functions as the visual output device 134 as described with respect to FIGS. 1A-1C.

When the keyboard 136 provides input to the first computer 40 via user input, the light source 158 has a first characteristic, such as color or intensity. When a user transitions the switch 152 from the first position to the second position, the light source 158 has a second characteristic, different from the first characteristic. For example, when the switch 152 is in the first position, and the user provides input to the first computer 40, the light source 158 is green. When the user moves the switch 152 to the second position, the light source 158 transitions to blue, thereby indicating to the user that the keyboard 136 is providing input to the second computer 42. Moving the switch 152 back to the first position resets to the original green colored light source 158.

Alternatively, when the switch 152 is in the first position, and the user provides input to the first computer 40, the light source 158 is at a first intensity. When the user moves the switch 152 to the second position, the light source 158 transitions to a greater or lesser intensity, thereby indicating to the user that the keyboard 136 is providing input to the second computer 42. Moving the switch 152 back to the first position resets to the original backlight intensity. Variations may include only affecting the intensity when the switch 152 is moved to the other position and transitioning to the original intensity after a set duration of time (e.g., a few seconds). In some embodiments, one of the intensities may be when the light source 158 is off, and the other intensity may be when the light source 158 is on.

Figure 4A:
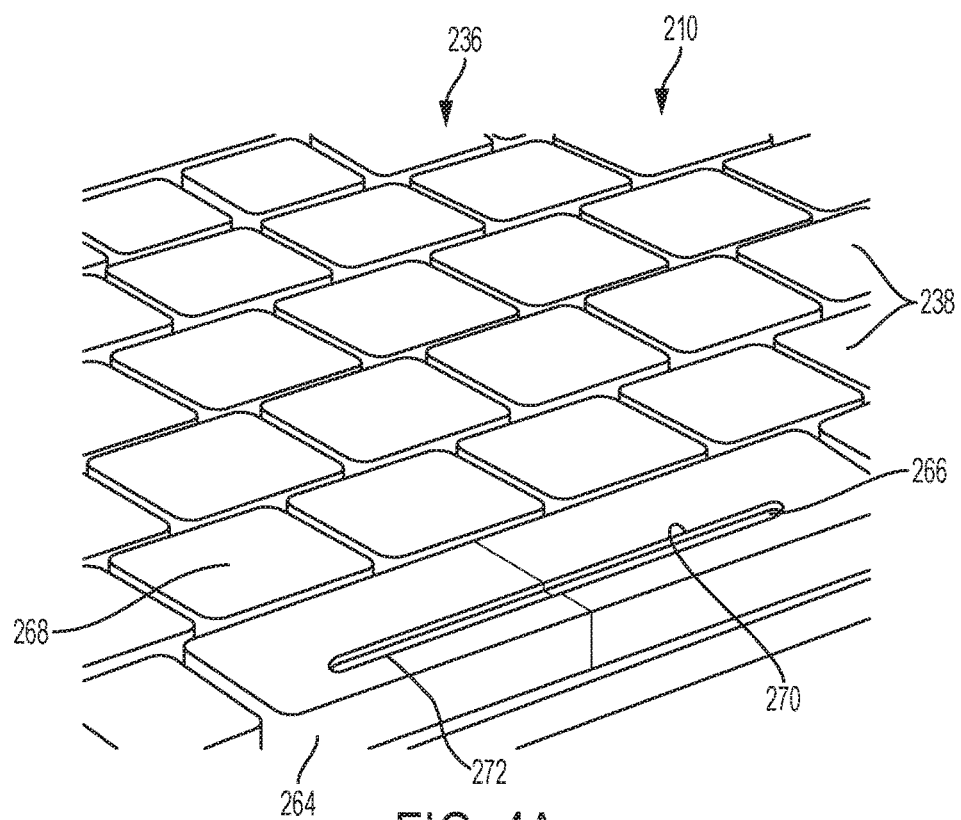
FIG. 4A is an enlarged perspective view of a portion of another keyboard, the keyboard including a plurality of keys and a haptic feedback device in a first position.

FIG. 4C illustrates another keyboard 236 that is operable to selectively communicate with multiple electronic devices 12, 14. The keyboard 236 includes a frame 216, a power source 256, a processor 230, a communication module 218, and a haptic feedback device 234. The keyboard 236 further includes a plurality of keys 238 (FIGS. 4A-4B) operable to provide input signals to the electronic devices 12, 14.

Figure 4B:
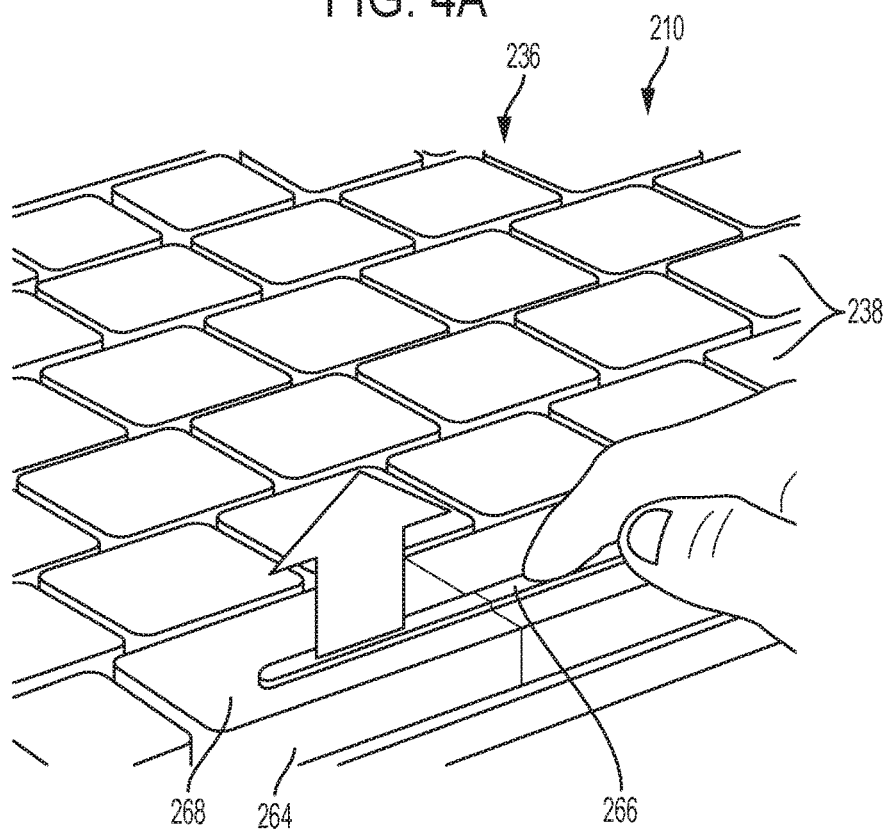
FIG. 4B is an enlarged perspective view of the portion of the keyboard shown in FIG. 4A, with the haptic feedback device in a second position.

As shown in FIGS. 4A-4B, the input device 210 (e.g., keyboard 236) is provided with the haptic feedback device 234 on one of the keys 238. For example, the haptic feedback device 234 may be supported by or part of a frequently used key that is regularly touched by a user, such as the spacebar. In the illustrated embodiment, the haptic feedback device 234 includes a movable projection 266 coupled to a spacebar 264. In other embodiments, the movable projection 266 may be coupled to a different key. The illustrated spacebar 264 includes a top surface 268 and a slot 270 formed in the top surface 268. The projection 266 is movable (e.g., slidable) relative to the top surface 268 between a first or retracted position (FIG. 4A), in which the projection 266 is either flush with or below the top surface 268 of the spacebar 264, and a second or extended position (FIG. 4B), in which the projection 266 extends above the top surface 268 of the spacebar 264. Therefore, when the user contacts the spacebar 264, the haptic feedback device 234 provides a tactile change to designate which electronic device 12, 14 is currently in communication with the keyboard 236.

The projection 266 is operatively coupled to the switch 252 to move between the retracted and extended positions in response to movement of the switch 252. For example, when a contact member or slider of the switch 252 is in a first position (similar to the contact member 154 shown in FIG. 3B), the projection 266 is recessed within the spacebar 264, such that a user does not feel the projection 266 when contacting the key 264. Additionally, if the projection 266 is recessed relative to the top surface 268 of the spacebar 266, the user may feel a lip 272 defined at the edge of the top surface 268 around the slot 270, alerting the user that the keyboard 236 is in communication with the first electronic device 12. When the contact member or slider of the switch 252 moves to a second portion (similar to the contact member 154 shown in FIG. 3C), the projection 266 extends above the top surface 268 of the key 264, such that the user feels the projection 266 when contacting the key 264, alerting the user that the keyboard 236 is in communication with the second electronic device 14. When the switch 252 moves from the second position back to the first position, the portion 266 of the key 264 returns to the first position.

In some embodiments, the projection 266 may be coupled to the switch 252 by a mechanical linkage to move the projection 266 between the retracted and extended positions in response to physical movement of the switch 252. In other embodiments, the projection 266 may be coupled to a solenoid or other small motor that moves the projection 266 between the retracted and extended positions in response to an electrical signal from the switch 252.

FIGS. 5A-7D illustrate keyboards 336, 436, 536 relative to the monitors 44, 46 of the first and second desktop computers 40, 42. It should be understood that the keyboards 336, 436, 536 communicate with the computers 40, 42 themselves, not with the monitors 44, 46. The monitors 44, 46 are used in the drawings to provide a visual representation of which of the computers 40, 42 the keyboards 336, 436, 536 are currently connected to.

FIG. 5C illustrates another keyboard 336 that is operable to selectively communicate with multiple electronic devices 12, 14. The keyboard 336 includes a frame 316, a power source 356, a processor 330, a communication module 318, a switch 352, and a haptic feedback device 334. The keyboard 336 further includes a plurality of keys 338 operable to provide input signals to the electronic devices 12, 14.

Figure 5B:
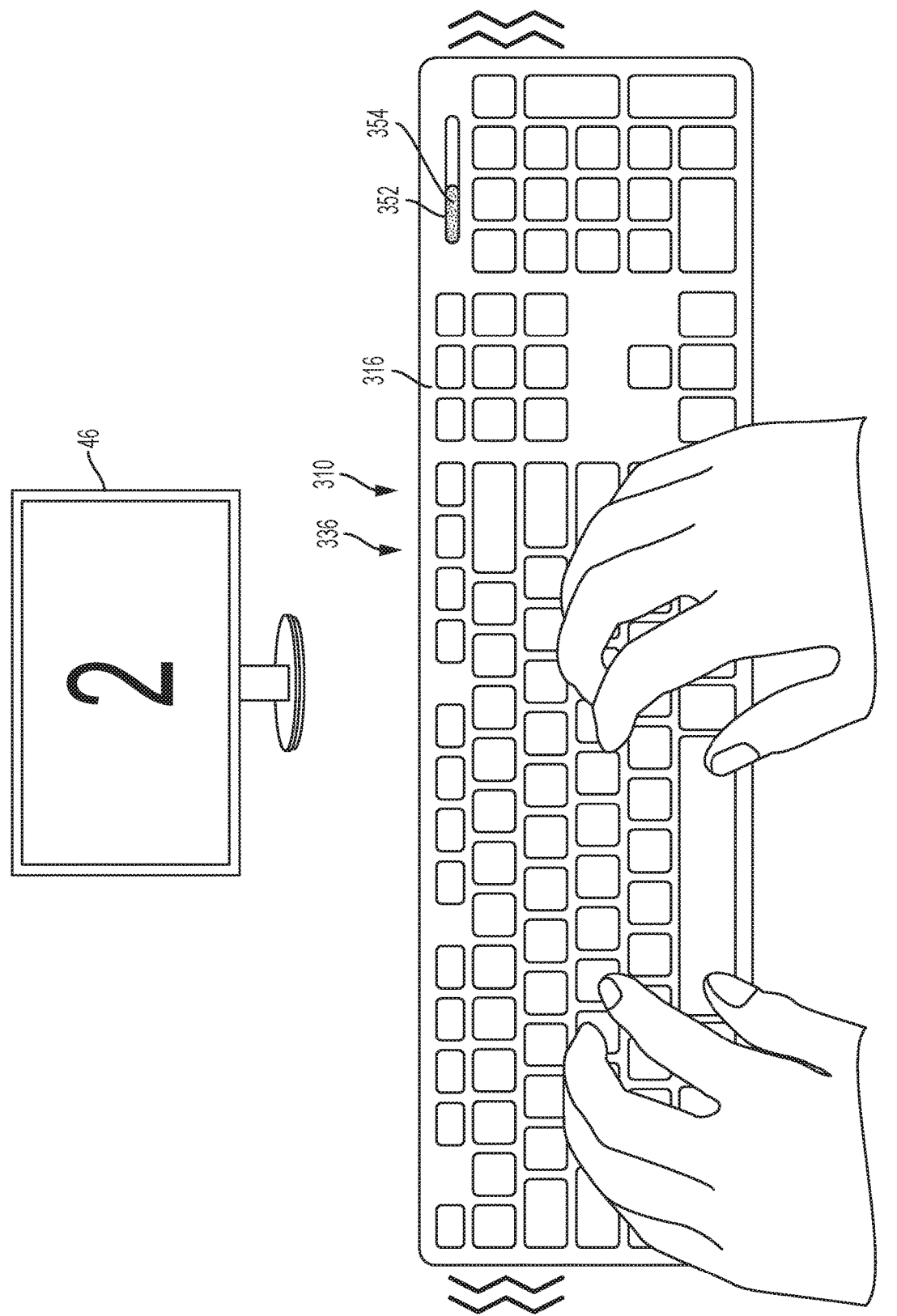
FIG. 5B is a top view of the keyboard shown in FIG. 5B in communication with the second desktop computer.

The input device 310 (e.g., keyboard 336) shown in FIGS. 5A-5B includes the haptic feedback device 334, as previously described with respect to FIGS. 1A-1C. In the illustrated embodiment, the haptic feedback device 334 is a vibrational element 372 (e.g., eccentric rotating mass vibration motor, linear resonant actuator, etc.) providing a vibrational output. The vibrational element 372 is supported by the frame 316 of the keyboard 336. When a contact member 354 of the switch 352 is in a first position, as shown in FIG. 5A, the vibrational element 372 is dormant and the keyboard 336 does not provide a haptic output. When the contact member 354 of the switch 352 is moved to a second position, as shown in FIG. 5B, the vibrational element 372 is activated. In this state, the vibrational element 372 provides a vibrational output (e.g., vibrates all or a portion of the keyboard 336), alerting the user that the keyboard 336 is in communication with the second electronic device 14.

In the illustrated embodiment, the vibrational element 372 is activated when the switch 352 is moved from the first position to the second position. Once activated, the vibrational element 372 may provide a vibration upon every keystroke, may provide a vibration after a set latency period (e.g., 5 seconds, 30 seconds, etc.) without keystrokes, or may only provide a vibrational output when the contact member 354 is initially moved to the second position. In some embodiments, the vibrational element 372 may be delayed in providing a haptic output after the contact member 354 is moved until the user contacts one of the plurality of keys 338.

Alternatively, the vibrational element 372 may be activated when the switch 352 is moved to either position. If the switch 352 is capable of translating between more than two positions (each position relating to a different electronic device and/or an OFF-position to power down the input device), the vibrational element 372 may provide a number of vibrational bursts (e.g., short, repeatable patterns of outputs) relating to the specific position of the switch 252. For example, when the switch 352 is in the first position, the vibrational element 372 may provide a single vibrational burst; when the switch 352 is in the second position, the vibrational element 372 may provide two vibrational bursts; and the like. The vibrational bursts may or may not be tied to a user actuating one of the keys 338. Alternatively, the frequency of the vibrations produced by the vibrational element 372 may be changed depending on the position of the switch 352. For example, when the switch 352 is in the first position, the vibrational frequency produced by the vibrational element 372 may be a high frequency; when the switch 352 is in the second position, the vibrational element 372 may produce a low vibrational frequency (i.e., relative to the high frequency).

Figure 6A:
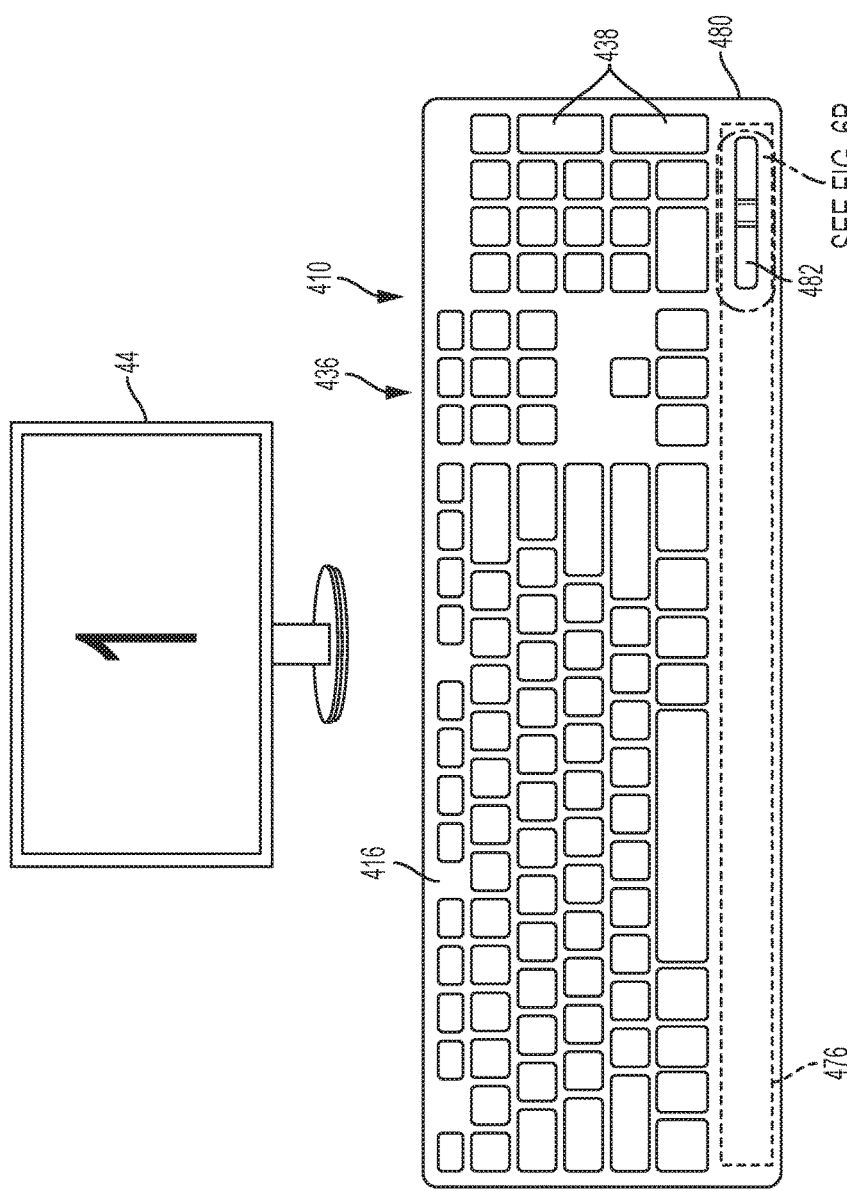
FIG. 6A is a top view of another keyboard in communication with the first desktop computer, the keyboard including a rocker.
Figure 6B:
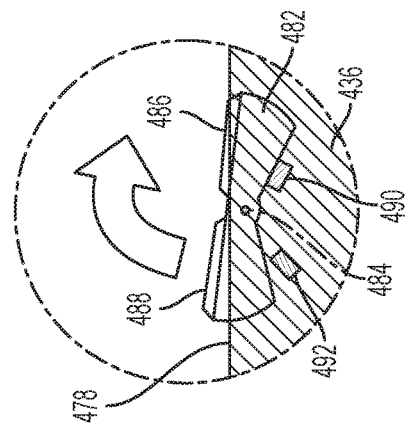
FIG. 6B is an enlarged cross-sectional view of a portion of the keyboard of FIG. 6A with the rocker in a first position.
Figure 6E:
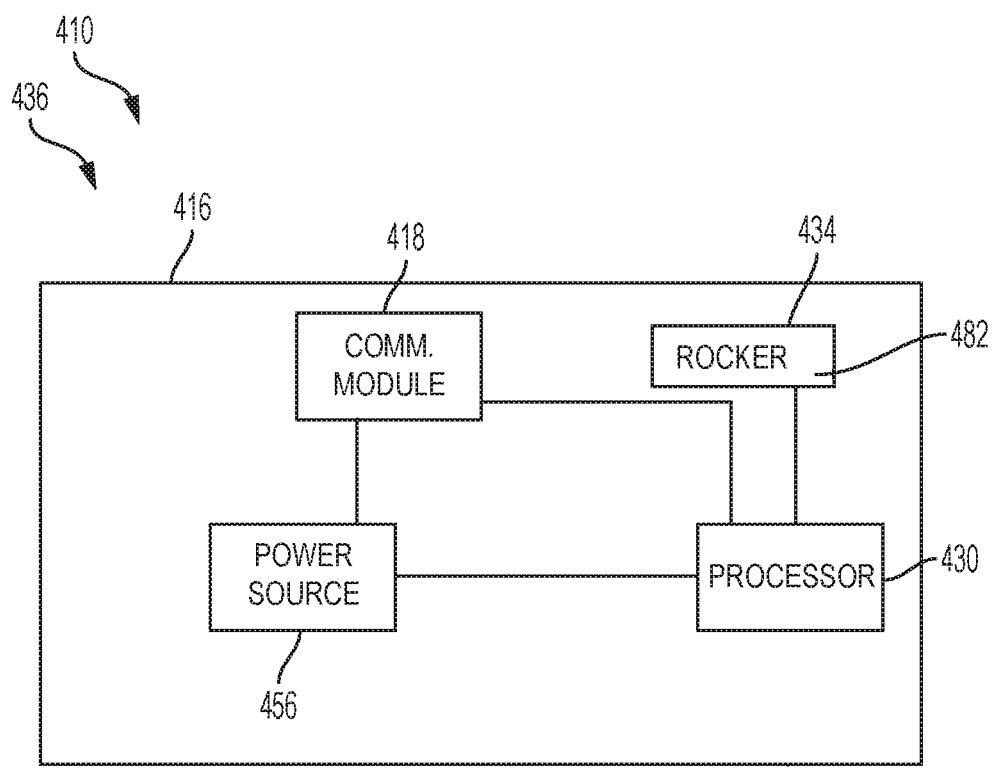
FIG. 6E is a schematic representation of the keyboard of FIGS. 6A-6D.

FIG. 6E illustrates another keyboard 436 that is operable to selectively communicate with multiple electronic devices 12, 14. The keyboard 436 includes a frame 416, a power source 456, a processor 430, a communication module 418, and a haptic feedback device 434. In this embodiment, the haptic feedback device 434 includes a rocker 482, which also acts as the switch to change which electronic device 12, 14 the keyboard 436 is communicating with. The keyboard 436 further includes a plurality of keys 438 operable to provide input signals to the electronic devices 12, 14.

As shown in FIGS. 6A-6D, the frame 416 of the keyboard 436 includes a wrist support portion 476 extending the length of the keyboard 436. The wrist support portion 476 forms part of an upper surface 478 of the frame 416. The keys 438 of the keyboard 436 extend from the upper surface 478 of the frame 416. The wrist support portion 476 is located along a lower portion 480 of the keyboard 436, and is adjacent or in contact with the wrists of a user when the keyboard 436 is in use.

The illustrated rocker 482 is pivotally coupled to the wrist support portion 476. The rocker 482 rotates about a pinned axis 484 between a first position (FIGS. 6A-6B), which corresponds to the keyboard 436 communicating with the first electronic device 12, and a second position (FIGS. 6C-6D), which corresponds to the keyboard 436 communicating with the second electronic device 14. The rocker 482 includes two engagement surfaces 486, 488 on opposing sides of the pinned axis 484 such that the rocker 482 can be contacted on either of the first or second engagement surfaces 486, 488 to rotate the rocker 482 about the pinned axis 484.

When in the first position, as shown in FIG. 6B, the first engagement surface 486 of the rocker 482 is in a downward orientation such that at least a portion of the first engagement surface 486 is below the top surface 478 defined by the wrist support portion 476 of the keyboard 436. In this position, the second engagement surface 488 is in an upward orientation such that the entire second engagement surface 488 extends above the top surface 478 defined by the wrist support portion 476 of the keyboard 436. The keyboard 436 also includes a first stop 490 to contact a lower surface of the rocker 482 and inhibit further rotation of the rocker 482 beyond the first position. The second engagement surface 488 provides a relatively large indicator in the wrist support portion 476 that can be viewed and felt by a user of the keyboard 436 to identify that the rocker 482 is in the first position. In some embodiments, the second engagement surface 488 may glow to provide further indication that the rocker 482 is in the first position.

When in the second position, as shown in FIG. 6D, the second engagement surface 488 of the rocker 482 is in a downward orientation such that at least a portion of the second engagement surface 488 is below the top surface 478 defined by the wrist support portion 476 of the keyboard 436. In this position, the first engagement surface 486 is in an upward orientation such that the entire first engagement surface 486 extends above the top surface 478 defined by the wrist support portion 476 of the keyboard 436. The keyboard 436 also includes a second stop 492 to contact the lower surface of the rocker 482 and inhibit further rotation of the rocker 482 beyond the second position. Similar to the second engagement surface 488, the first engagement surface 486 provides a relatively large indicator in the wrist support portion 476 that can be viewed and felt by a user to the keyboard 436 to identify that the rocker 482 is in the second position. In some embodiments, the first engagement surface 486 may glow to provide further indication that the rocker 482 is in the second position.

As shown in FIG. 6E, the rocker 482 is also coupled to processor 430 to control which electronic device 12, 14 the keyboard 436 communicates with. When the rocker 482 is in the first position, a signal is transmitted to the communication module 418 via the processor 430 to establish communication between the keyboard 436 and the first electronic device 12 such that user inputs to the plurality of keys 438 are sent to the first electronic device 12. When the rocker 482 is in the second position, a signal is transmitted to the communication module 418 via the processor 430 to establish communication between the keyboard 436 and the second electronic device 14 such that user inputs to the plurality of keys 438 are sent to the second electronic device 14.

Figure 7E:
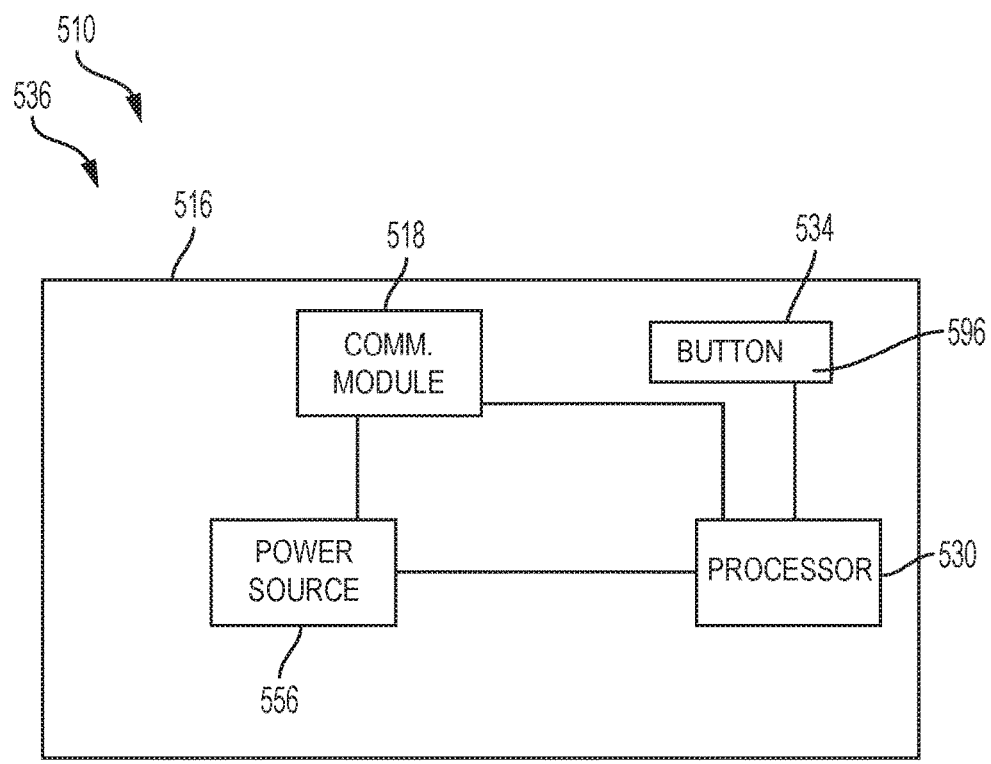
FIG. 7E is a schematic representation of the keyboard of FIGS. 7A-7D.

FIG. 7E illustrates another keyboard 536 that is operable to selectively communicate with multiple electronic devices 12, 14. The keyboard 536 includes a frame 516, a power source 556, a processor 530, a communication module 518, and a haptic feedback device 534. In this embodiment, the haptic feedback device 534 includes a button 596, which also acts as the switch to change which electronic device 12, 14 the keyboard 536 is communicating with. The keyboard 536 further includes a plurality of keys 538 operable to provide input signals to the electronic devices 12, 14.

As shown in FIGS. 7A-7D, the frame 516 of the keyboard 536 includes a wrist support portion 576, similar to the keyboard 436 of FIGS. 6A-6D. The wrist support portion 576 forms part of an upper surface 578 of the frame 516.

The button 596 is supported by the wrist support portion 576. The button 596 is movable (e.g., slidable) between a first position (FIG. 7B), which corresponds to the keyboard 536 communicating with the first electronic device 12, and a second position (FIG. 7D), which corresponds to the keyboard 536 communicating with the second electronic device 14. In the illustrated embodiment, the button 596 is a push-push button which requires a downward movement (relative to FIG. 7B) to actuate the button 596 from the second position to the first position, and a subsequent downward movement to actuate the button 596 from the first position to the second position. When actuated into the first position, as shown in FIG. 7B, the button 596 is recessed below the top surface 578 defined by the wrist support portion 576 of the keyboard 536. When actuated into the second position, as shown in FIG. 7D, at least part of the button 596 (e.g., a top engagement surface 598 of the button 596) extends above the upper surface 578 defined by the wrist support portion 576 of the keyboard 536. Similar to the rocker 482 shown in FIGS. 6A-6D, the illustrated button 596 provides a relatively large indicator in the wrist support portion 576 that can be viewed and felt by a user of the keyboard 536 to identify the position of the button 596. In some embodiments, the button 596 may glow when in one of the positions, or may glow a different color in each position, to provide further indication that the button 596 is in a particular position.

As shown in FIG. 7E, the button 596 is also coupled to the processor 530 to control which electronic device 12, 14 the keyboard 536 communicates with. When the button 596 is in the first position, a signal is transmitted to the communication module 518 via the processor 530 to establish communication between the keyboard 536 and the first electronic device 12 such that user inputs to the plurality of keys 538 are sent to the first electronic device. When the button 596 is in the second position, a signal is transmitted to the communication module 518 via the processor 530 to establish communication between the keyboard 536 and the second electronic device 14 such that user inputs to plurality of keys 540 are sent to the second electronic device 14.

Both the rocker 482 (FIGS. 6A-6D) and the button 596 (FIGS. 7A-7D) serve as visually and tactilely obtrusive indicators 434, 534, informing a user of which electronic device 12, 14 is currently in communication with the keyboard 436, 536, as well as providing the input required to switch between the electronic devices 12, 14. The rocker 482 and button 596 are located in a high-use and high-visibility area of the keyboard 436, 536 such that a user is able to visually scan or feel which electronic device 12, 14 is receiving input from the input device 410, 510 without disrupting usage of the input device 410, 510.

It should be appreciated that the various features associated with the embodiments of FIGS. 1-7E may be variously combined within the scope of the invention.

Various features and advantages of the invention are set forth in the following claims.

The invention claimed is:

1. An input device for use with a first electronic device and a second electronic device, the input device comprising:
a frame;
a plurality of manually depressible input members supported by the frame;
a communication module supported by the frame and operable to selectively communicate with the first electronic device and the second electronic device;
a switch supported by the frame and coupled to the communication module, the switch operable to change whether the communication module communicates with the first electronic device or the second electronic device; and
a light source coupled to the switch and positioned at least partially within the frame, the light source operable to provide a backlight for the plurality of input members, the backlight being modified in response to actuation of the switch to identify which one of the first electronic device or the second electronic device is connected to the input device.

2. The input device of claim 1, wherein the input device is a keyboard and the plurality of input members is a plurality of keys.

3. The input device of claim 1, wherein a color of the backlight is modified in response to actuation of the switch.

4. The input device of claim 1, wherein an intensity of the backlight is modified in response to actuation of the switch.

5. The input device of claim 1, wherein the communication module includes a wireless transceiver that selectively communicates with the first electronic device.

6. The input device of claim 1, wherein each of the plurality of input members is actuatable to send an input command to the first and second electronic devices, and wherein the switch is a separate actuator from the plurality of input members.

7. The input device of claim 1, wherein the switch is movable between a first position, in which the communication device communicates with the first electronic device, and a second position, in which the communication device communicates with the second electronic device, and wherein the backlight is modified in response to movement between the first position and the second position.

8. The input device of claim 7, wherein the light source provides the backlight in a first color when the switch is in the first position and provides the backlight in a second color that is different than the first color when the switch is in the second position.

9. The input device of claim 1, wherein the switch includes a contact member that is manually actuatable to change whether the communication module communicates with the first electronic device or the second electronic device.

10. The input device of claim 9, wherein the contact member is movable between a first position associated with the first electronic device, and a second position associated with the second electronic device.

11. An input device for use with a first electronic device and a second electronic device, the input device comprising:
a frame;
a plurality of manually depressible input members supported by the frame;
a communication module supported by the frame and operable to selectively communicate with the first electronic device and the second electronic device;
a switch supported by the frame and coupled to the communication module, the switch operable to change whether the communication module communicates with the first electronic device or the second electronic device; and
a haptic feedback device coupled to the switch and supported by the frame, the haptic feedback device providing tactile feedback in response to actuation of the switch to identify which one of the first electronic device or the second electronic device is connected to the input device.

12. The input device of claim 11, wherein the switch is movable between a first position, in which the communication module communicates with the first electronic device, and a second position, in which the communication module communicates with the second electronic device, and wherein the haptic feedback device provides tactile feedback in response to movement between the first position and the second position.

13. The input device of claim 11, wherein the haptic feedback device is located on one of the plurality of input members, and wherein the haptic feedback device extends outwardly from the one of the plurality of input members in response to actuation of the switch.

14. The input device of claim 11, wherein the haptic feedback device includes a motor that vibrates the frame in response to actuation of the switch.

15. The input device of claim 11, wherein the communication module includes a wireless transceiver that selectively communicates with the first electronic device.

16. The input device of claim 11, wherein the switch includes a contact member that is manually actuatable to change whether the communication module communicates with the first electronic device or the second electronic device, and wherein the contact member is movable between a first position associated with the first electronic device, and a second position associated with the second electronic device.

17. The input device of claim 11, wherein each of the plurality of input members is actuatable to send an input command to the first and second electronic devices, and wherein the switch is a separate actuator from the plurality of input members.

18. The input device of claim 11, wherein the input device is a keyboard and the plurality of input members is a plurality of keys.

19. The input device of claim 18, wherein the frame includes a wrist support portion formed adjacent a row of the plurality of keys, and wherein the input device includes a button supported on the wrist support portion.

20. The input device of claim 19, wherein the button is a rocker pivotally coupled to the wrist support portion of the frame, wherein the rocker includes a first engagement surface and a second engagement surface, and wherein the rocker is pivotable relative to an upper surface of the wrist support portion between a first position, in which the first engagement surface extends above the upper surface and at least part of the second engagement surface is positioned below the upper surface, and a second position, in which at least part of the first engagement surface is positioned below the upper surface and the second engagement surface extends above the upper surface.

21. The input device of claim 19, wherein the button is slidable relative to an upper surface of the wrist support portion between a first position, in which at least part of the button extends above the upper surface, and a second position, in which the button is recessed below the upper surface.

* * * * *